US008936369B2

(12) United States Patent
Isobe

(10) Patent No.: US 8,936,369 B2
(45) Date of Patent: Jan. 20, 2015

(54) ILLUMINATOR AND DISPLAY UNIT

(75) Inventor: Hiroshi Isobe, Kanagawa (JP)

(73) Assignee: Sony Corporation, Tokyo (JP)

( * ) Notice: Subject to any disclaimer, the term of this patent is extended or adjusted under 35 U.S.C. 154(b) by 166 days.

(21) Appl. No.: 13/617,661

(22) Filed: Sep. 14, 2012

(65) Prior Publication Data
US 2013/0077061 A1 Mar. 28, 2013

(30) Foreign Application Priority Data

Sep. 26, 2011 (JP) ................................. 2011-209253

(51) Int. Cl.
G03B 21/20 (2006.01)
H04N 9/31 (2006.01)
G02B 27/48 (2006.01)

(52) U.S. Cl.
CPC .............. H04N 9/3161 (2013.01); G02B 27/48 (2013.01); G03B 21/2033 (2013.01); G03B 21/208 (2013.01); H04N 9/3111 (2013.01)
USPC .................. 353/85; 353/31; 353/94; 353/99; 359/212.1; 359/224.1

(58) Field of Classification Search
USPC ........... 353/31, 37, 38, 85, 94, 99; 359/212.1, 359/214.1, 224.1, 199.1, 199.3, 199.4, 359/200.7, 200.8; 348/743–747, E9.026; 349/5, 7–9
See application file for complete search history.

(56) References Cited

U.S. PATENT DOCUMENTS

| 8,553,305 | B2 * | 10/2013 | Nakamura et al. .......... 359/200.7 |
| 2008/0074562 | A1 * | 3/2008 | Endo et al. ..................... 348/758 |
| 2008/0170285 | A1 * | 7/2008 | Kasazumi et al. ............. 359/223 |
| 2009/0027748 | A1 * | 1/2009 | Sprague et al. ............... 359/199 |
| 2009/0153933 | A1 * | 6/2009 | Tsuchiya et al. ........... 359/204.1 |
| 2010/0002152 | A1 * | 1/2010 | Nishioka et al. .............. 348/744 |
| 2010/0271680 | A1 * | 10/2010 | Fujii et al. .................. 359/213.1 |
| 2011/0205456 | A1 * | 8/2011 | Mizoguchi et al. ............... 349/5 |
| 2012/0275001 | A1 * | 11/2012 | Ishibashi .................... 359/199.1 |

FOREIGN PATENT DOCUMENTS

JP 2005-301164 10/2005

* cited by examiner

Primary Examiner — Sultan Chowdhury
(74) Attorney, Agent, or Firm — Dentons US LLP

(57) ABSTRACT

An illuminator includes: a light source section including a laser light source; an optical element through which a laser beam from the laser light source passes; a driving section oscillating the optical element; and a control section controlling, in a driving operation performed by the driving section, the driving operation to allow an oscillating amplitude value of the optical element in a startup period of the optical element to be equal to or less than the oscillating amplitude value of a steady-state operation period of the optical element that is subsequent to the startup period.

18 Claims, 13 Drawing Sheets

FORCE GENERATED BY CURRENT FLOWING
THROUGH COIL AND MAGNETIC FLUX
(FLEMING'S LEFT-HAND RULE)

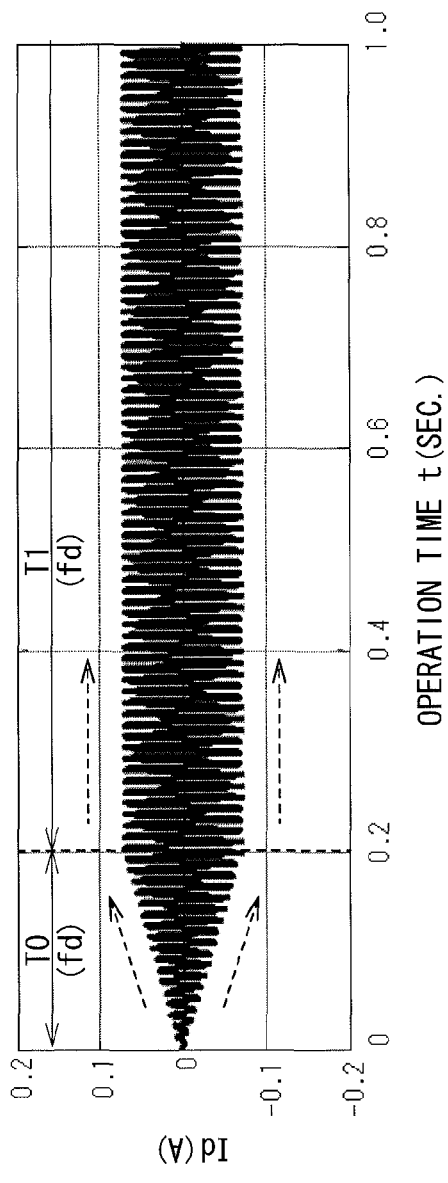
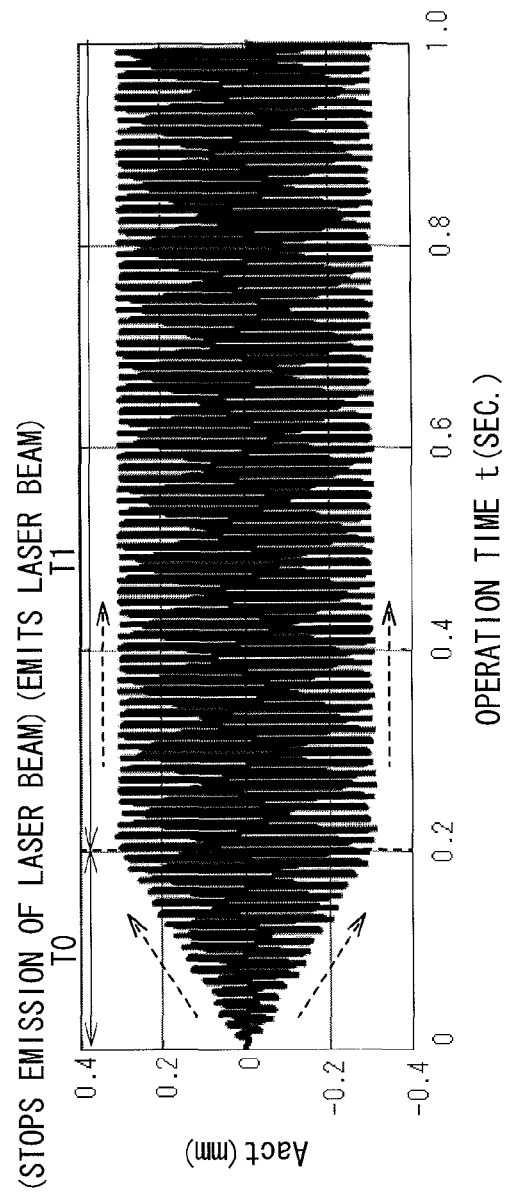
FIG. 10A
FIG. 10B

ILLUMINATOR AND DISPLAY UNIT

BACKGROUND

The present disclosure relates to an illuminator that emits out illumination light including a laser beam, and a display unit that carries out an image display using such illumination light.

An optical module, which is one of main components of a projector (projection-type display unit), is generally composed of an illuminating optical system (illuminator) including a light source and a projecting optical system (projection optical system) including an optical modulation element. In recent years, in the field of such a projector, a small-sized (palm size) and lightweight portable projector called a microprojector has begun to come into wide use. In the past, for this microprojector, an LED (Light Emitting Diode) has been mainly utilized as a light source for an illuminator.

Meanwhile, a laser has recently drawn attention as a new light source for an illuminator. For example, a projector utilizing a gas laser has been known in the past as a projector using a laser beam of three primary colors including red (R), green (G), and blue (B). As described above, a projector utilizing a laser as a light source is proposed in, for example, Japanese Unexamined Patent Application Publication No. 2005-301164. Use of a laser as a light source allows to achieve a projector with a wide color reproduction range and a reduced power consumption.

SUMMARY

Meanwhile, in irradiating coherent light such as a laser beam on a diffusing surface, a punctate pattern that would not be found in ordinary light is observed. Such a pattern is called a speckle pattern. This speckle pattern occurs because light that is scattered at each point on the diffusing surface interferes with each other in a random phase relation depending on the microscopic irregularity on the surface.

Hereupon, for a projector utilizing a laser as a light source as described above, such a speckle pattern (interference pattern) is superimposed on a displayed image on a screen. Consequently, such a superimposed speckle pattern is perceived as a strong random noise by human eyes, resulting in the display image quality being degraded.

Accordingly, as a technique to reduce generation of such a speckle pattern (speckle noise) in a projector utilizing a laser as a light source, a method is proposed that slightly oscillates a predetermined optical element which a laser beam passes through or a screen within a projector. Typically, it may be impossible that human eyes and brain discriminate flickering of an image within a time period of about 20 to 50 ms. That is, an image within such a time period is integrated and averaged in human eyes. Therefore, the method intends to attempt an averaging of a speckle noise to a degree that is not interfering in human eyes by superimposing many independent speckle patterns on a screen within such a time period. Use of such a method makes it possible to reduce generation of an interference pattern caused by a laser beam.

Hereupon, during the oscillation of such an optical element, a phenomenon where an amplitude (oscillating amplitude value) thereof becomes excessive may arise in some cases. In such a case, the optical element may collide with surrounding members (such as, for example, a holding member of the optical element and a unit housing), which could lead to generation of an abnormal noise, or a failure of the optical element, surrounding members thereof, and the like. For this reason, a method is desirable that allows to reduce generation of the above-described interference pattern while reducing an adverse effect caused by an excessive oscillating amplitude of the optical element.

It is desirable to provide an illuminator and a display unit that allow to reduce generation of an interference pattern while reducing an adverse effect caused by an excessive oscillating amplitude of an optical element.

An illuminator according to an embodiment of the present disclosure includes: a light source section including a laser light source; an optical element through which a laser beam from the laser light source passes; a driving section oscillating the optical element; and a control section controlling, in a driving operation performed by the driving section, the driving operation to allow an oscillating amplitude value of the optical element in a startup period of the optical element to be equal to or less than the oscillating amplitude value of a steady-state operation period of the optical element that is subsequent to the startup period.

A display unit according to an embodiment of the present disclosure includes: an illuminator emitting illumination light; and an optical modulation element modulating the illumination light based on an image signal. The illuminator includes: a light source section including a laser light source; an optical element through which a laser beam from the laser light source passes; a driving section oscillating the optical element; and a control section controlling, in a driving operation performed by the driving section, the driving operation to allow an oscillating amplitude value of the optical element in a startup period of the optical element to be equal to or less than the oscillating amplitude value of a steady-state operation period of the optical element that is subsequent to the startup period.

In the illuminator and the display unit according to the embodiments of the present disclosure, generation of an interference pattern caused by the laser beam is reduced, by oscillating the optical element through which the laser beam from the laser light source passes. Further, the driving operation for the optical element (an oscillating operation of the optical element) is so controlled as to allow the oscillating amplitude value of the optical element in the startup period to be equal to or less than the oscillating amplitude value of the subsequent steady-state operation period. This reduces an excessive oscillating amplitude due to a transient response phenomenon during the startup period of the optical element.

In the illuminator and the display unit according to the embodiments of the present disclosure, the optical element through which the laser beam from the laser light source passes is oscillated, and the oscillating amplitude value of the optical element in the startup period is made equal to or less than the oscillating amplitude value of the subsequent steady-state operation period in the driving operation for the optical element. Thus, an excessive oscillating amplitude due to a transient response phenomenon during the startup period is reduced. As a result, it is possible to reduce generation of an interference pattern, while avoiding an adverse effect caused by an excessive oscillating amplitude of the optical element (for example, possibility of generation of an abnormal noise, or a failure of the optical element, surrounding members thereof, and the like).

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the present disclosure, and are incorporated in and constitute a part of this specification. The drawings illustrate embodiments and, together with the specification, serve to explain the principles of the present technology.

Figure 9:
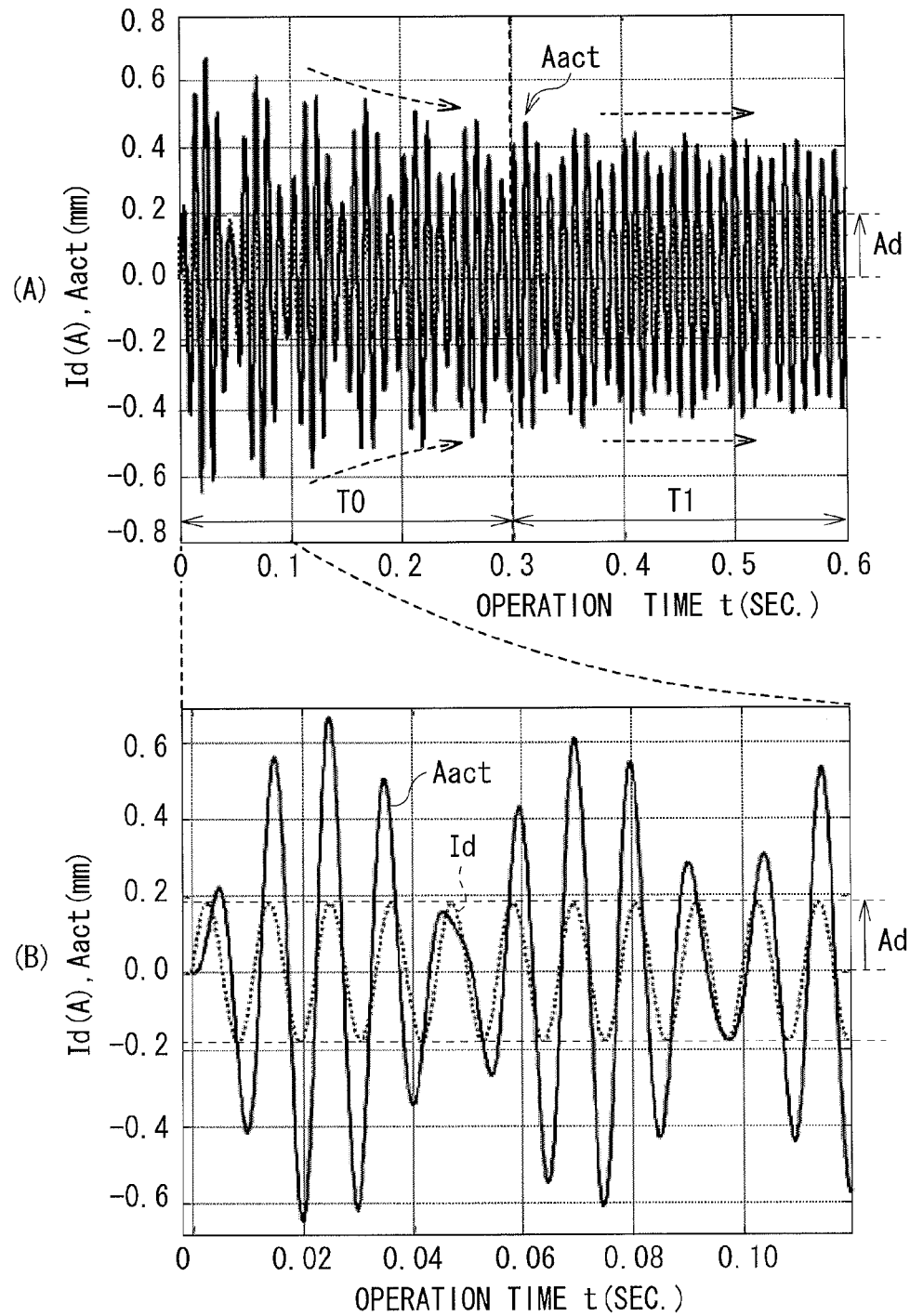

(A) and (B) of FIG. 9 are timing waveform diagrams showing a relationship of an amplitude value of a driving current and an oscillating amplitude value of an optical element with an operation time according to a comparative example 2.

FIGS. 10A and 10B are timing waveform diagrams showing an example of a relationship of an amplitude value of a driving current and an oscillating amplitude value of an optical element with an operation time according to a first embodiment.

Figure 11:
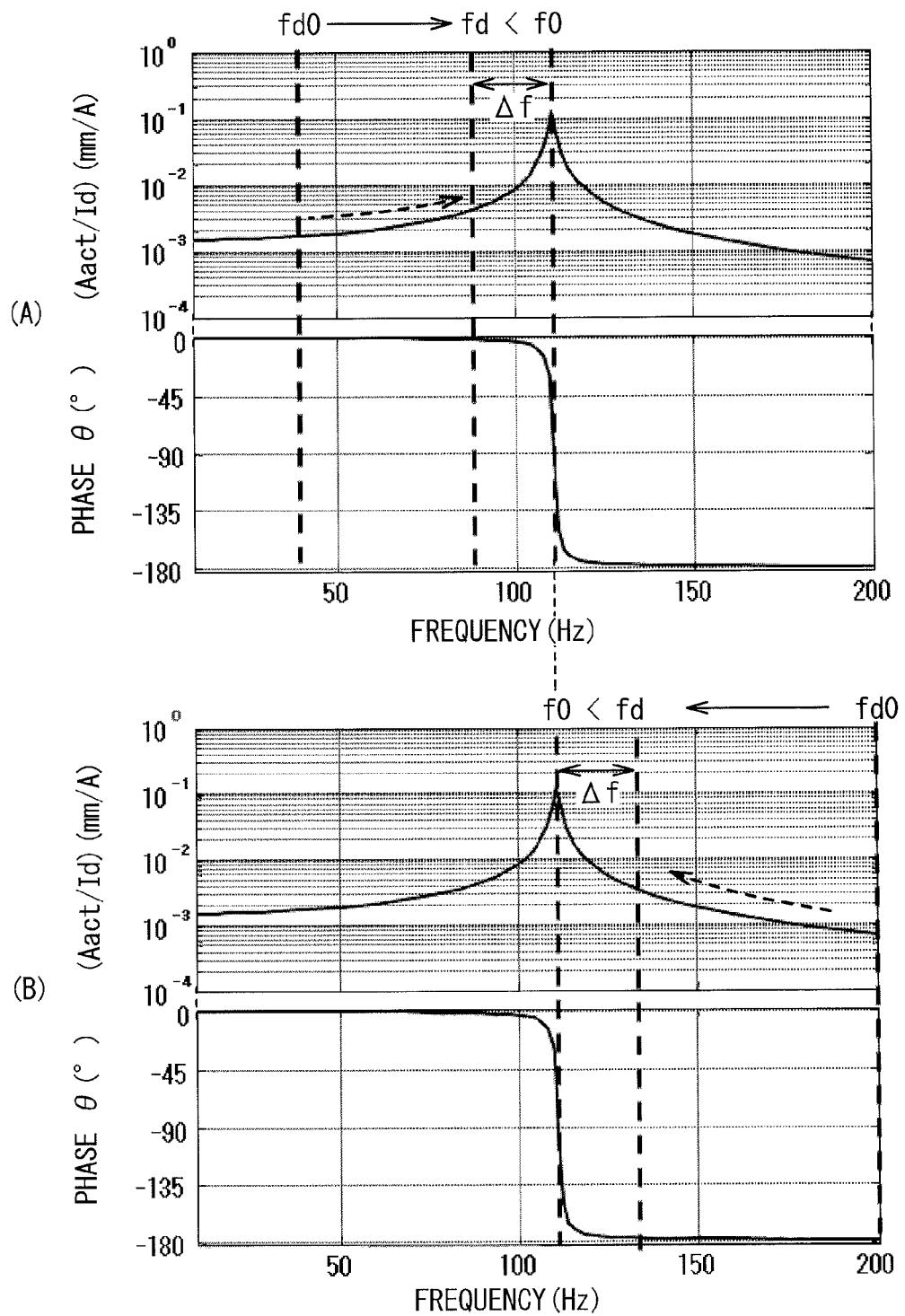

(A) and (B) of FIG. 11 are characteristic diagrams for explaining an outline of a method for controlling a driving frequency according to a second embodiment.

Figure 12:
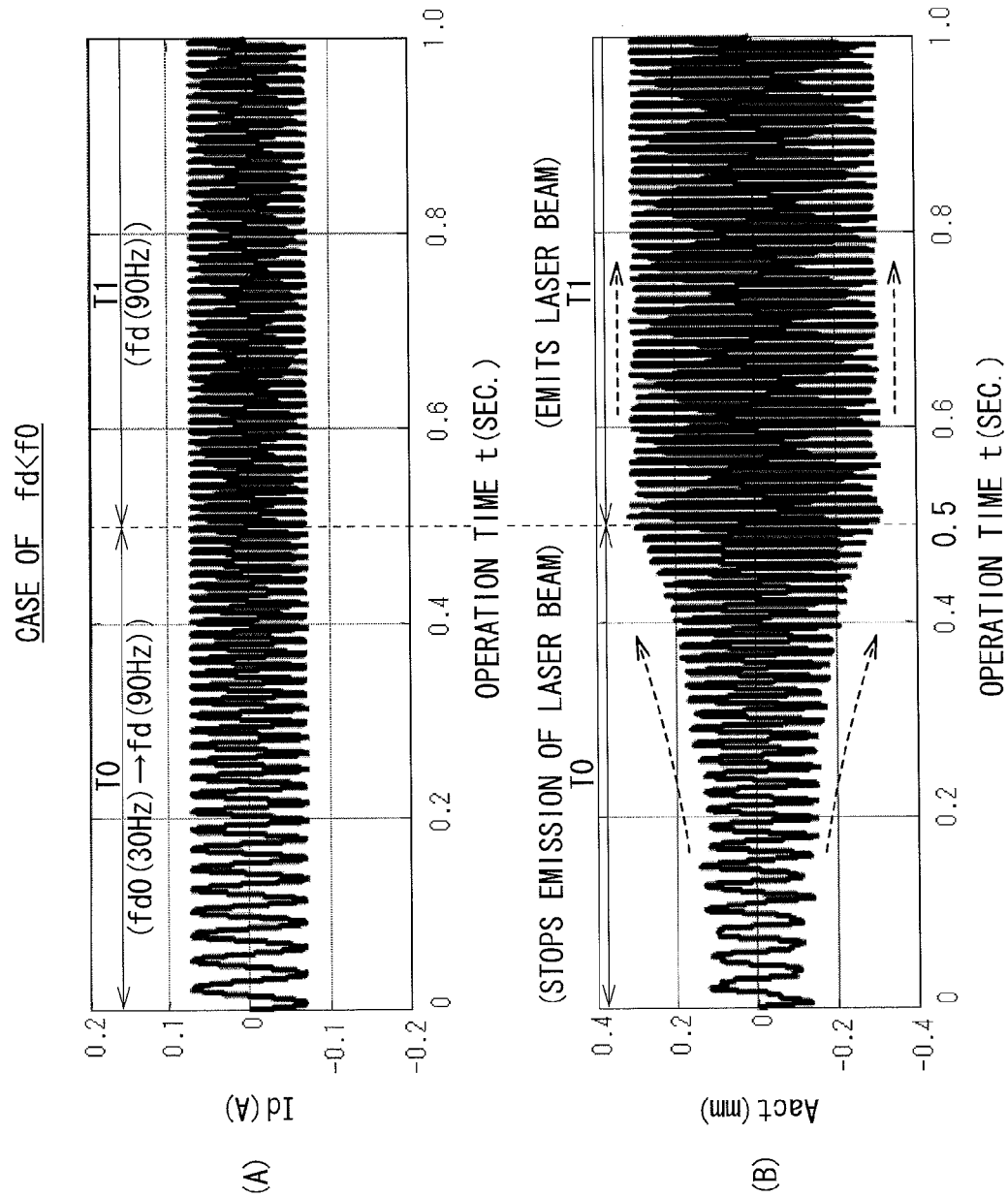

(A) and (B) of FIG. 12 are timing waveform diagrams showing an example of a relationship of an amplitude value of a driving current, a driving frequency, and an oscillating amplitude value of an optical element with an operation time according to a second embodiment.

Figure 13:
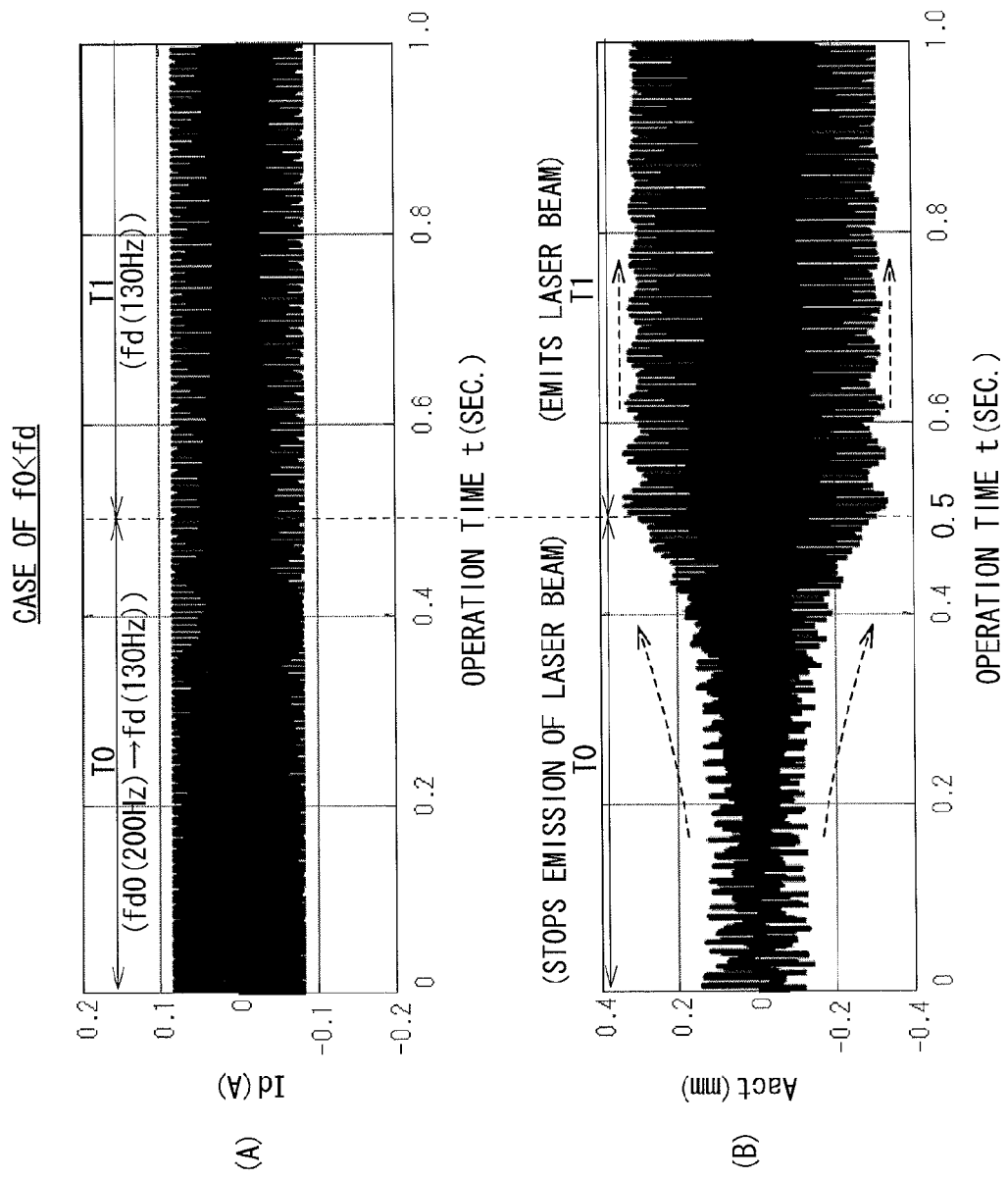

(A) and (B) of FIG. 13 are timing waveform diagrams showing another example of a relationship of an amplitude value of a driving current, a driving frequency, and an oscillating amplitude value of an optical element with an operation time according to a second embodiment.

FIGS. 14A to 14D are timing waveform diagrams schematically showing an example of a method for controlling an oscillating amplitude value of an optical element according to modification examples.

DETAILED DESCRIPTION

Hereinafter, embodiments of the present disclosure are described in details with reference to the drawings. It is to be noted that the descriptions are provided in the order given below.

1. First embodiment (example where an oscillating amplitude value of an optical element is controlled by controlling a signal amplitude value)
2. Second embodiment (example where an oscillating amplitude value of an optical element is controlled by controlling a signal frequency)
3. Modification examples common to first and second embodiments (example of other methods for controlling an oscillating amplitude value)
4. Other modification examples (1. First Embodiment)
[Simplified Configuration of Display Unit 1]

Figure 1:
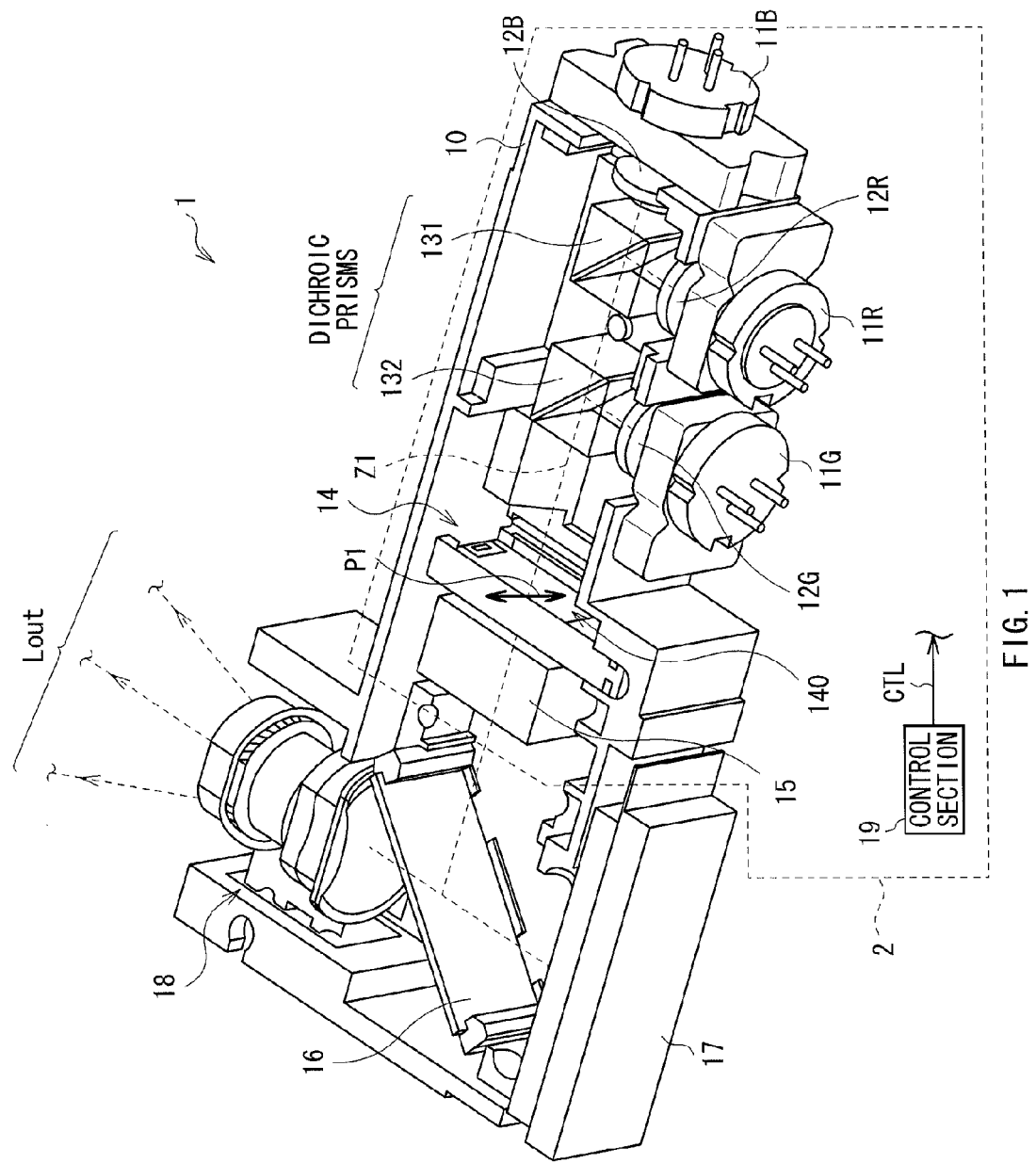
FIG. 1 is a diagram showing a simplified configuration of a display unit according to a first embodiment of the present disclosure.

FIG. 1 is a perspective diagram showing a simplified configuration (cross-sectional structure) of a display unit according to a first embodiment of the present disclosure (display unit 1). The display unit 1 is a projection-type display unit to project an image (image light) on a screen (surface being projected) that is not shown in the figure. Within a housing 10, the display unit 1 includes a red-color laser 11R, a green-color laser 11G, a blue-color laser 11B, collimator lenses 12R, 12G, and 12B, dichroic prisms 131 and 132, an optical device 14, and a fly-eye lens 15. Further, the display unit 1 also includes a PBS (Polarization Beam Splitter) 16, a reflection mode liquid crystal element 17, a projection lens 18 (projecting optical system), and a control section 19. Among these, the red-color laser 11R, the green-color laser 11G, the blue-color laser 11B, the collimator lenses 12R, 12G, and 12B, the dichroic prisms 131 and 132, the optical device 14, the fly-eye lens 15, and the control section 19 compose an illuminator (illuminator 2) according to an embodiment of the present disclosure. It is to be noted that Z1 shown in the figure indicates an optical axis.

The red-color laser 11R, the green-color laser 11G, and the blue-color laser 11B are three types of light sources that emit a red-color laser beam, a green-color laser beam, and a blue-color laser beam, respectively. These laser light sources compose a light source section, where all of these three types of light sources are served as laser light sources in this embodiment. Each of the red-color laser 11R, the green-color laser 11G, and the blue-color laser 11B is composed of, for example, a semiconductor laser, a solid-state laser, and the like.

The collimator lenses 12R, 12G, and 12B are lenses to collimate a red-color laser beam emitted from the red-color laser 11R, a green-color laser beam emitted from the green-color laser 11G, and a blue-color laser beam emitted from the blue-color laser 11B as parallel light, respectively.

The dichroic prism 131 is a prism that selectively transmits a blue-color laser beam collimated as parallel light by the collimator lens 12B therethrough, while selectively reflecting a red-color laser beam collimated as parallel light by the collimator lens 12R. The dichroic prism 132 is a prism that selectively transmits the blue-color laser beam and the red-color laser beam that are emitted from the dichroic prism 131 therethrough, while selectively reflecting a green-color laser beam collimated as parallel light by the collimator lens 12G. Through these dichroic prisms, color composition (optical path composition) for the red-color laser beam, green-color laser beam, and blue-color laser beam is carried out.

The optical device 14 is disposed between the above-described light source section (red-color laser 11R, green-color laser 11G, and blue-color laser 11B) and the reflection mode liquid crystal element 17 (on an optical path between the dichroic prism 132 and the fly-eye lens 15 in this embodiment). The optical device 14 has an optical element for reducing a speckle noise (interference pattern) to be hereinafter described (optical element 140). It is to be noted that a detailed configuration of the optical device 14 is described later (see FIG. 2 and FIG. 3).

The fly-eye lens 15, which is configured in such a manner that a plurality of lenses are arranged in a matrix in a plane on a substrate, divides incoming light flux spatially for emission in accordance with an arrangement of these lenses. Consequently, outgoing light from the fly-eye lens 15 is uniformized (in-plane intensity distribution is uniformized) to be emitted out as illumination light from the illuminator 2.

The polarization beam splitter 16 is an optical member that selectively transmits one specific polarized light (for example, p polarized light) therethrough, while selectively reflecting the other polarized light (for example, s polarized light). Consequently, illumination light (for example, s polarized light) that is emitted from the fly-eye lens 15 is selectively reflected to come into the reflection mode liquid crystal element 17, and image light outgoing from the reflection mode liquid crystal element 17 (for example, p polarized light) is selectively transmitted therethrough to come into the projection lens 18.

The reflection mode liquid crystal element 17 is an optical modulation element to emit out image light by reflecting while modulating light from the light source section (red-color laser 11R, green-color laser 11G, and blue-color laser 11B) (illumination light from the illuminator 2) on the basis of an image signal provided from a display control section that is not shown in the figure. At this time, the reflection mode liquid crystal element 17 carries out the reflection so that each polarized light at incoming time and outgoing time (for example, s polarized light or p polarized light) is different from each other. Such a reflection mode liquid crystal element 17 is composed of a liquid crystal element such as LCOS (Liquid Crystal On Silicon).

The projection lens 18 is a lens to project (magnified projection) light (image light) modulated by the reflection mode liquid crystal element 17 on a screen that is not shown in the figure. Through this lens, projection light Lout is projected on the screen.

The control section 19 controls a driving operation by the driving section for the later-described optical element 140 (optical element for reducing generation of an interference pattern) within the optical device 14. In concrete terms, in this driving operation, the control section 19 controls a driving operation to allow an oscillating amplitude value (oscillating amplitude value Aact to be hereinafter described) of the optical element 140 in a startup period (driving period T0 to be hereinafter described) of the optical element 140 to be equal to or less than an oscillating amplitude value of a subsequent steady-state operation period (steady-state operation period T1 to be hereinafter described). Such a control section 19 may be composed of a microcomputer for example. It is to be noted that the detailed description of the control section 19 is given later.

[Detailed Configuration of Optical Device 14]

Figure 2:
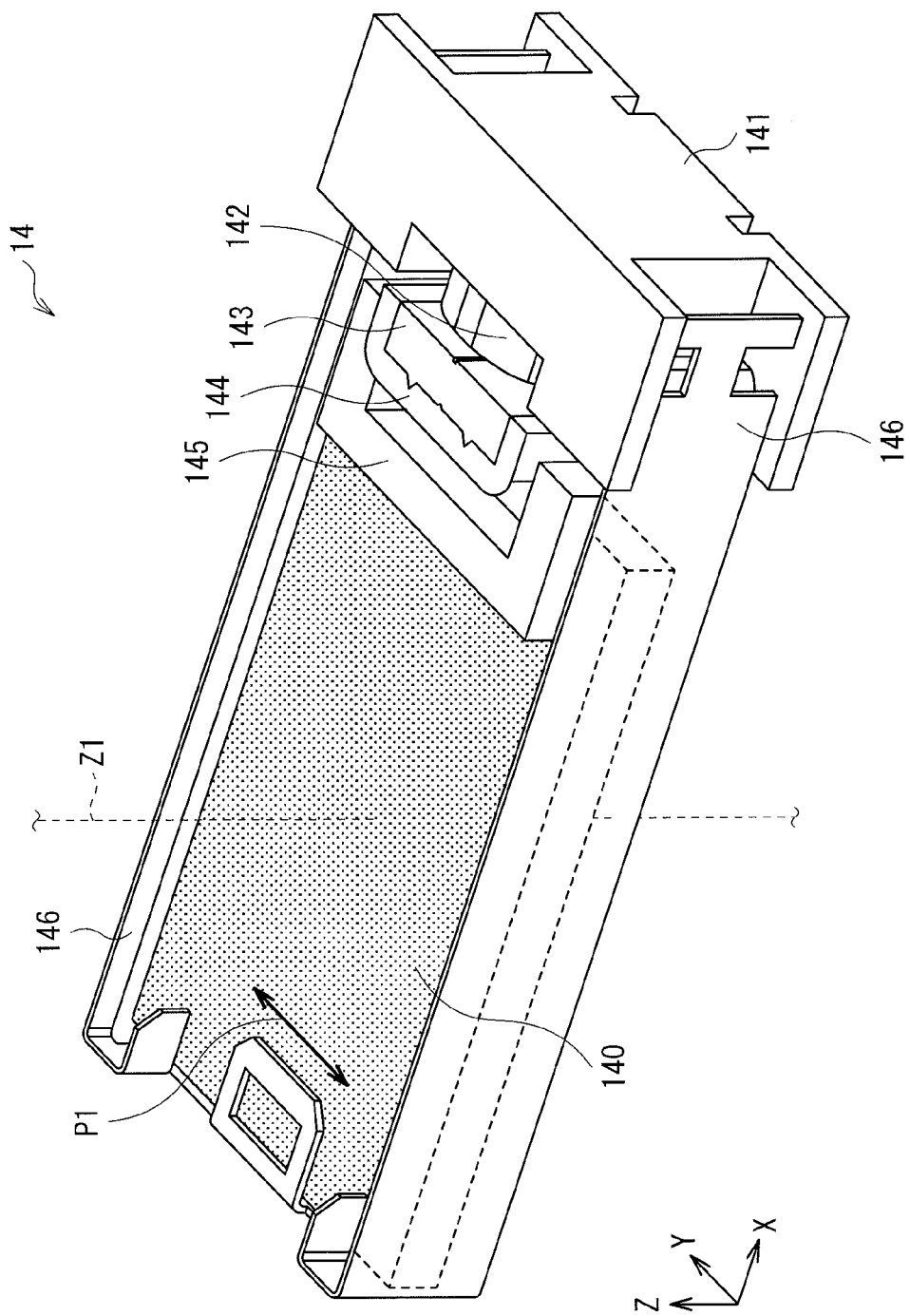
FIG. 2 is a perspective diagram showing a detailed configuration example of an optical device illustrated in FIG. 1.
Figure 3:
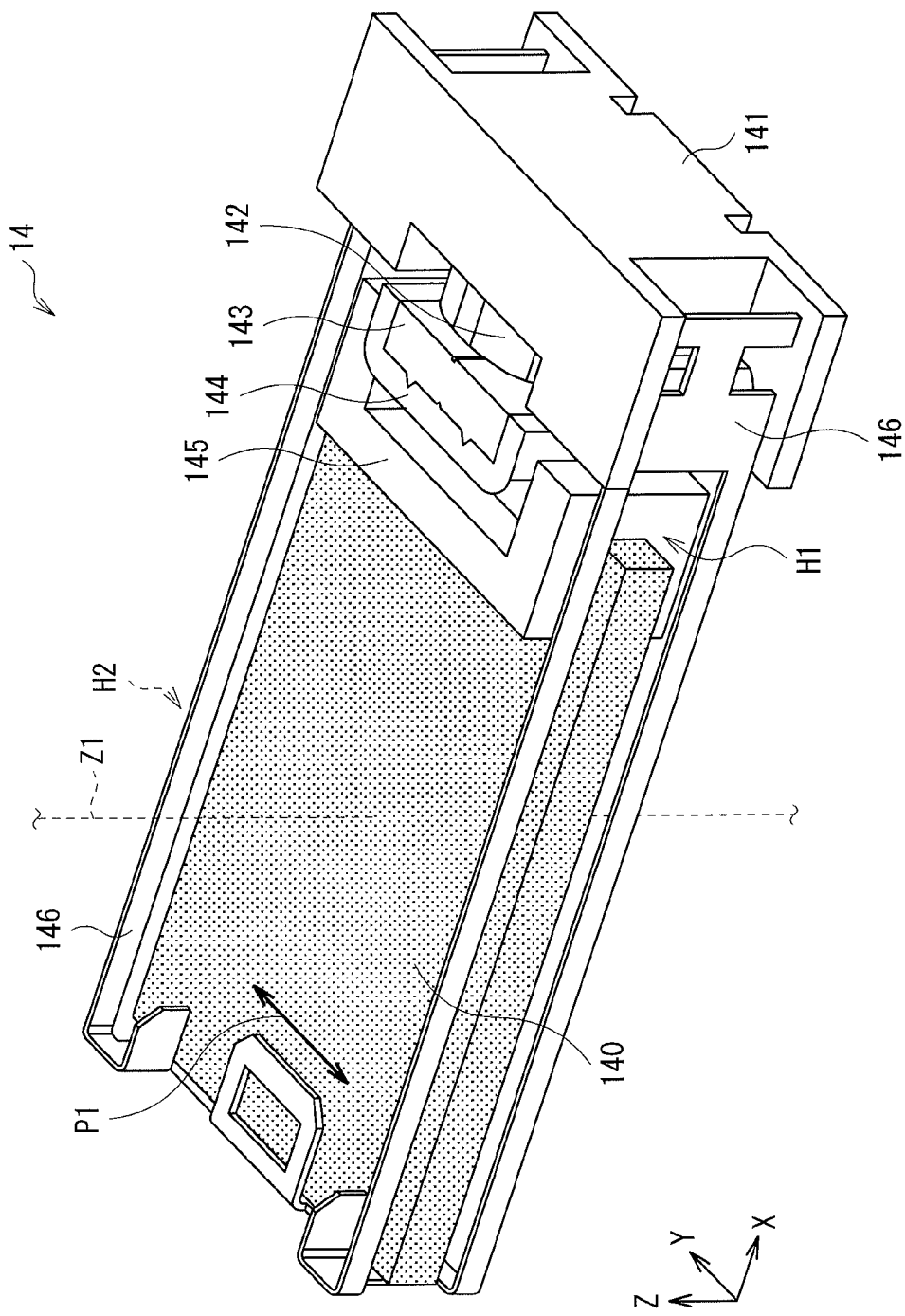
FIG. 3 is a perspective diagram showing another detailed configuration example of the optical device illustrated in FIG. 1.

Next, a detailed configuration of the above-described optical device 14 is described with reference to FIG. 2 and FIG. 3. Each of FIG. 2 and FIG. 3 is a perspective diagram showing a detailed configuration example of the optical device 14. The optical device 14 has the optical element 140, a fixed part holder 141, a coil 142, a magnet 143, a yoke 144, a moving part holder 145, and a plate spring 146 (holding member). Among these, the coil 142 and the fixed part holder 141 compose a "fixed part", while the optical element 140, the magnet 143, the yoke 144, and the plate spring 146 compose a "moving part".

The optical element 140 is an element for reducing a speckle noise as described above, and a laser beam going on the optical axis Z1 shown in the figures passes through this optical element 140. The optical element 140, which may be composed of, for example, a prism array, a diffracting element, or a lens, is in a rectangular shape in this embodiment.

The fixed part holder 141, which is a holder for holding the coil 142 corresponding to the above-described fixed part, may be composed of a material such as polycarbonate and liquid crystal polymer, for example.

The coil 142 may be composed of a winding coil for example. The magnet 143 is a permanent magnet, which may be composed of a material such as neodymium (Nd), iron (Fe), and boron (B), for example. The coil 142 and the magnet 143 use an electromagnetic force to oscillate (small oscillation) the optical element 140 in predetermined in-plane directions (one direction, two directions, rotation direction, and the like) that are orthogonal to an optical axis (corresponding to the optical axis Z1 in the figures) of a laser beam, or along this optical axis (optical axis Z1). In concrete terms, in this embodiment, the optical element 140 is oscillated along one predetermined in-plane direction that is orthogonal to the optical axis Z1 (oscillating direction P1 in the figures; Y-axis direction). It is to be noted that an oscillation amount of this small oscillation may be, for example, in the order of about +/−0.5 mm.

The yoke 144, which is a member for controlling a direction of a magnetic flux that is output from the magnet 143, may be composed of a high-permeability material such as iron (Fe), for example. Further, in this embodiment, the yoke 144 is disposed around the magnet 143 to prevent the magnetic flux from the magnet 143 from being output to the outside of an unit (outside of the optical device 14). In concrete terms, the yoke 144 is disposed to surround the surfaces in opposition to the surfaces on the coil 142 side (surfaces on the optical element 140 side) (Y-Z plane) and the side faces at these surfaces (Z-X plane) of the rectangular magnet 143.

The moving part holder 145, which is a holder for holding the optical element 140, the magnet 143, the yoke 144, and the plate spring 146 that are served as the above-described moving part, is disposed between the optical element 140 and the yoke 144 in this embodiment. The moving part holder 145 may be composed of a material such as polycarbonate and liquid crystal polymer, for example.

The plate spring 146, which is a holding member to hold the optical element 140, is each disposed at a pair of opposing side surfaces (Z-X plane) on the rectangular optical element 140 in this embodiment. The plate spring 146 is an elastic member, being composed of a spring material such as SUS301-CSP, for example. Further, on the plate spring 146, it is preferable to perform a surface treatment (such as, for example, black painting, mat finishing, and blast finishing (sandblasting and the like)) for reducing the optical reflectance. In concrete terms, it is preferable that the plate spring 146 have a top surface in black color, and, for example, it is preferable to perform a surface treatment ensuring that the reflectance for light with the waveband ranging from 400 to 700 nm is reduced to 10% or less. This is because when the plate spring 146 is made of metal, it is possible to reduce deterioration in the display image quality that is caused by the diffused reflection light on this top surface.

Specifically, in an example of the optical element 140 illustrated in FIG. 3, the plate spring 146 is provided with opening apertures H1 and H2 which the optical element 140 goes through (being allowed to go through, being inserted into, or being allowed to be inserted into) during the oscillation. That is, the opening aperture H1 is provided at one side surface (Z-X plane) on the plate spring 146, while the opening aperture H2 (not shown in FIG. 3) is provided at the other side surface (Z-X plane). In concrete terms, each of the opening apertures H1 and H2 takes a rectangular form (slit form) in this embodiment, being provided to prevent the optical element 140 and the plate spring 146 from coming into contact (collide) with one another during the oscillation of the optical element 140. Therefore, formation of such opening apertures H1 and H2 allows to reduce generation of an interference pattern (speckle noise) to be hereinafter described without providing a space dealing with the oscillation between the optical element 140 and the plate spring 146. This makes it possible to reduce generation of any interference pattern (improve the display image quality) while achieving the miniaturization. It is to be noted that each of the opening apertures H1 and H2 may be, for example, in the order of 1 mm×10 mm in size.

[Substantial Part Configuration of Driving Section for Optical Element 140]

Figure 4:
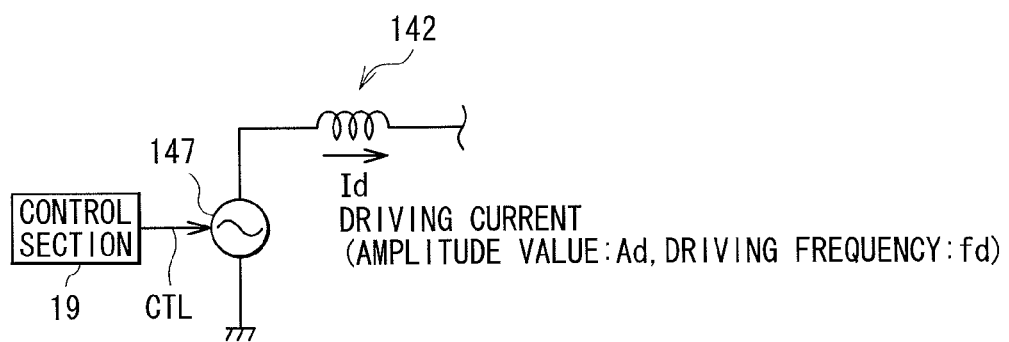
FIG. 4 is a schematic diagram showing a substantial part configuration example of a driving section for an optical element along with a control section.

Next, the description is provided on a substantial part configuration of the driving section for the above-described optical element 140 with reference to FIG. 4. FIG. 4 is a schematic diagram showing a substantial part configuration example of the driving section for the optical element 140 along with the above-described control section 19. The driving section for the optical element 140 has a signal generator 147 shown in an example in FIG. 4 in addition to the coil 142, the magnet 143, and the like as described above. In the figure, a first end of the signal generator 147 is connected with a first end of the coil 142, while a second end thereof is earthed (connected with a ground).

The signal generator 147 is a power supply that generates an AC voltage to be used in driving (oscillating) the optical element 140. Through the operation of the signal generator 147, an AC driving current Id (amplitude value: Ad, frequency (driving frequency: fd) as shown in FIG. 4 flows through the coil 142, resulting in an electromagnetic force at the time of the driving operation being generated. Here, if the time is t, Id (t) representing a change in the driving current Id over the time t is defined as expression (1) given below. It is to be noted that each of the amplitude value Ad and the driving frequency fd as described above in the driving current Id (driving signal) at this time is controlled by the above-described control section 19, which will be described later in greater detail.

$$Id(t)=Ad\times Sin(2\times \pi \times fd \times t) \quad (1)$$

[Operation and Advantageous Effects of Display Unit 1]

(1. Display Operation)

First, in the display unit 1, illumination light is emitted out of the illuminator 2 in the following manner. That is, each of light beams (laser beams) emitted by the red-color laser 11R, the green-color laser 11G, and the blue-color laser 11B respectively is collimated by the collimator lenses 12R, 12G, and 12B to be parallel light. Next, the color composition (optical path composition) for each of the laser beams (red-color laser beam, green-color laser beam, and blue-color laser beam) that are collimated into the parallel light in such a manner is carried out by the dichroic prisms 131 and 132. Each of the laser beams for which the optical path composition is performed passes through the optical device 14, and then comes into the fly-eye lens 15. This incoming light is uniformized (in-plane intensity distribution is uniformized) by the fly-eye lens 15 to be emitted out as the illumination light.

Subsequently, the outgoing light from the fly-eye lens 15 (illumination light from the illuminator 2) is selectively reflected by the polarization beam splitter 16 to come into the reflection mode liquid crystal element 17. On the reflection mode liquid crystal element 17, this incoming light is reflected while being modulated on the basis of an image signal, thereby being emitted as image light. At this time, on the reflection mode liquid crystal element 17, each polarized light at incoming time and outgoing time is different from each other, and thus the image light emitted from the reflection mode liquid crystal element 17 is selectively transmitted through the polarization beam splitter 16 to come into the projection lens 18. Thereafter, this incoming light (image light) is projected (magnified projection) on the screen that is not shown in the figure by the projection lens 18.

At this time, each of the red-color laser 11R, the green-color laser 11G, and the blue-color laser 11B performs light emission (pulse light emission) sequentially on a time-division basis, emitting out each of the laser beams (red-color laser beam, green-color laser beam, and blue-color laser beam). On the reflection mode liquid crystal element 17, each of the laser beams of the corresponding color is modulated sequentially on a time-division basis in accordance with the image signal of each color component (red-color component, green-color component, and blue-color component). Consequently, the color image display based on the image signal is carried out on the display unit 1.

(2. Operation for Reducing Interference Pattern)

Next, the detailed description is provided on the operation for reducing an interference pattern to be hereinafter described, while comparing with a comparative example (comparative example 1).

(2-1. Comparative Example 1)

Figure 5:
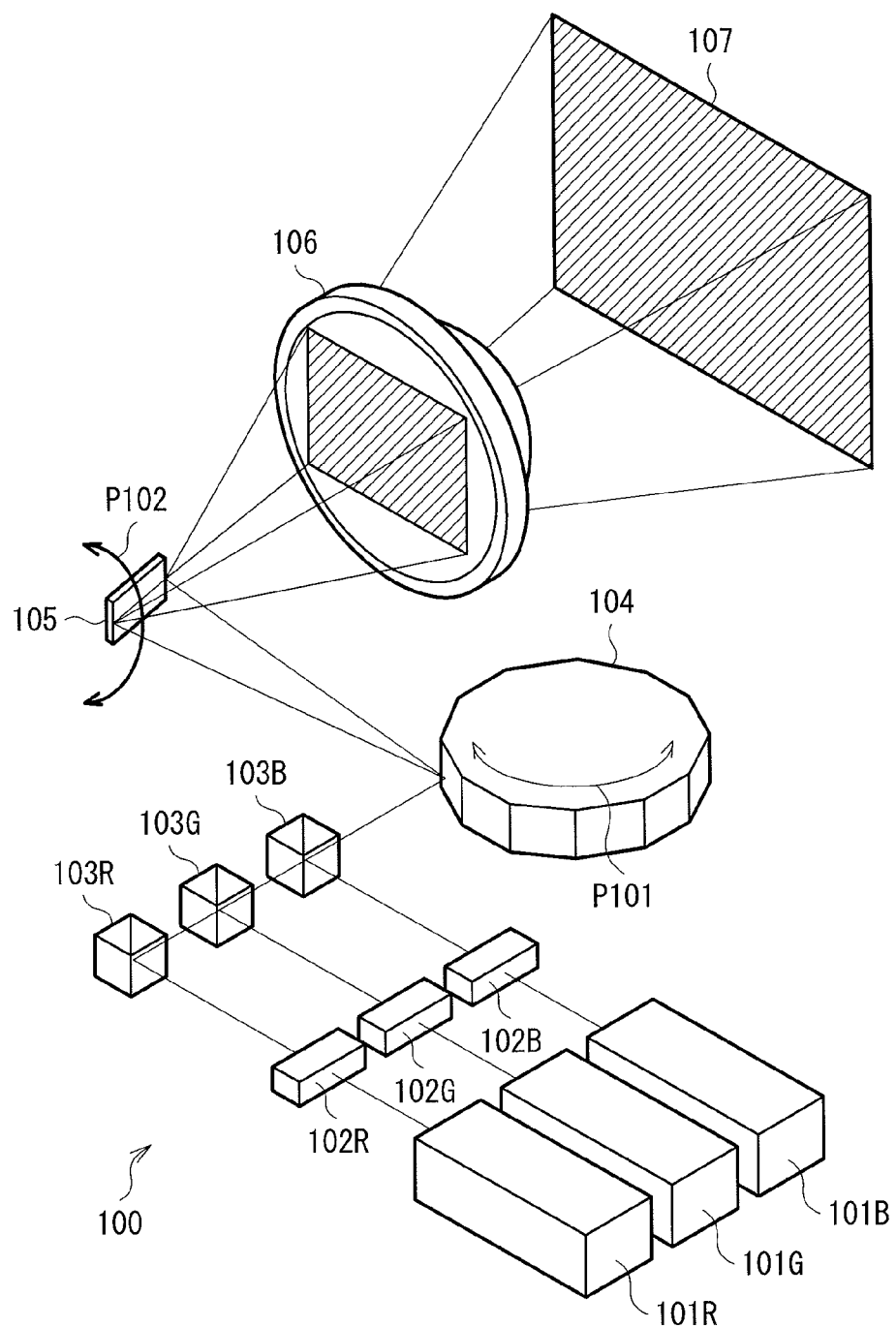
FIG. 5 is a perspective diagram showing an overall configuration of a display unit according to a comparative example 1.

FIG. 5 shows an overall configuration of a display unit according to a comparative example 1 (display unit 100). As in the display unit 1 according to this embodiment of the present disclosure, the display unit 100 in the comparative example 1 is a projection-type display unit to project image light on a screen (screen 107 in this example). The display unit 100 includes a red-color laser 101R, a green-color laser 101G, a blue-color laser 101B, optical power modulators 102R, 102G, and 102B, dichroic mirrors 103R, 103G, and 103B, a polygon mirror 104, a galvanometer mirror 105, and an f-θ lens 106.

In the display unit 100, a laser beam emitted out of the red-color laser 101R transmits through the optical power modulator 102R while being modulated on the basis of an image signal in the optical power modulator 102R to be emitted as image light. Similarly, a laser beam emitted out of the green-color laser 101G transmits through the optical power modulator 102G while being modulated on the basis of an image signal in the optical power modulator 102G to be emitted as image light. Further, a laser beam emitted out of the blue-color laser 101B transmits through the optical power modulator 102B while being modulated on the basis of an image signal in the optical power modulator 102B to be emitted as image light. The color composition (optical path composition) for the image light of each color that is emitted from the optical power modulators 102R, 102G, and 102B respectively in such a manner is carried out on the dichroic mirrors 103R, 103G, and 103B, and the resulting image light comes into the polygon mirror 104 as the image light corresponding to each color image. This incoming light is polarized in a horizontal direction by the polygon mirror 104 that performs high-speed rotation in synchronization with a horizontal synchronization signal (see an arrow mark P101 in the figure). Additionally, the light polarized in a horizontal direction as described is further polarized in a vertical direction by the galvanometer mirror 105 that changes a reflection angle in synchronization with a vertical synchronization signal (see an arrow mark P102 in the figure). Thereafter, the laser beam polarized in a two-dimensional method in such a manner is projected (magnified projection) on the screen 107 by the f-θ lens 106. Consequently, the color image display based on the image signal is carried out on the display unit 100.

Figure 6:
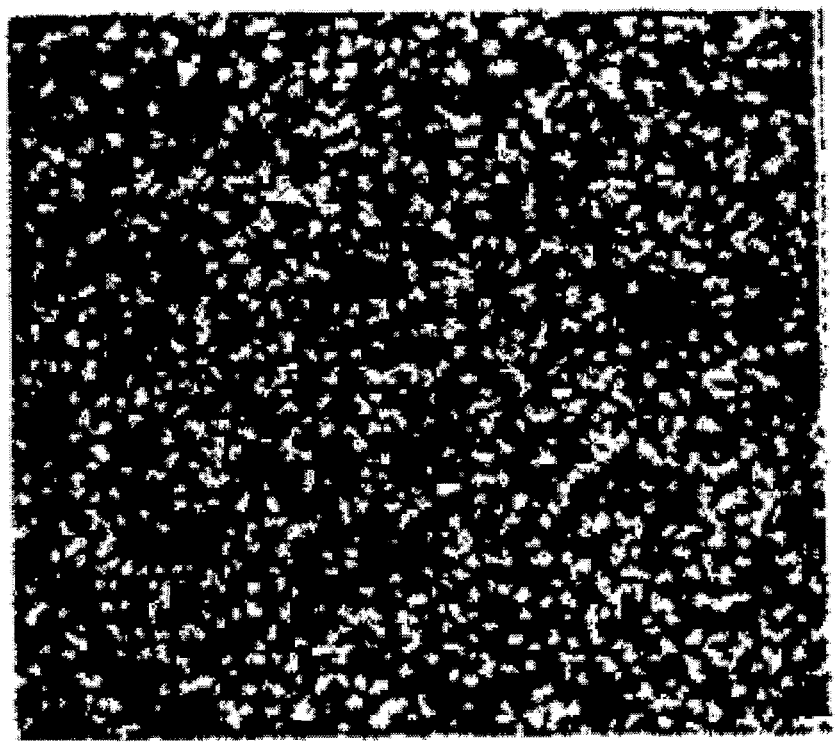
FIG. 6 is a diagram showing an example of an interference pattern arising on a surface being projected.

Meanwhile, in irradiating coherent light such as a laser beam on a diffusing surface, as indicated in a picture shown in FIG. 6 for example, a punctate pattern that would not be found in ordinary light is observed. Such a pattern is called a speckle pattern. This speckle pattern occurs because light that is scattered at each point on the diffusing surface interferes with each other in a random phase relation depending on the microscopic irregularity on the surface. It is to be noted that such a speckle pattern is roughly divided into two types in general. One is observed without attaching an imaging system, being called a diffracted field speckle. This diffracted field speckle is observed when diffused light is viewed without attaching a lens to a CCD (Charged Coupled Device) for example. For the diffracted field speckle, all points where light is irradiated on a diffusing surface contribute to an interference. The other is viewed when observation is made through an imaging system, and a speckle observed in viewing a diffusing surface with eyes falls under this type of speckle pattern. Such a speckle is called an imaging field speckle.

Hereupon, for a projector utilizing a laser light source as in the display unit 100 according to the above-described comparative example 1, such a speckle pattern (interference pattern) described above is superimposed on a displayed image on a screen. Consequently, such a superimposed speckle pattern is perceived as a strong random noise by human eyes, resulting in the display image quality being degraded.

Accordingly, to reduce generation of such a speckle pattern (speckle noise) in a projector utilizing a laser light source, a method may be contemplated that slightly oscillates a predetermined optical element which a laser beam passes through or a screen within a projector. Typically, it may be impossible that human eyes and brain discriminate flickering of an image within a time period of about 20 to 50 ms. That is, an image within such a time period is integrated and averaged in human eyes. Therefore, the method intends to attempt an averaging of a speckle noise to a degree that is not interfering in human eyes by superimposing many independent speckle patterns on a screen within such a time period.

(2-2. Present Embodiment)

Accordingly, in the optical device 14 according to the present embodiment as well, as shown in FIG. 1 to FIG. 3, the optical element 140 that a laser beam passes through oscillates (small oscillation) within a plane (within X-Y plane; oscillating direction P1 along Y-axis direction in this embodiment) that is orthogonal to an optical path (optical axis Z1) of the laser beam. In concrete terms, the optical element 140 is driven in such a manner that the oscillation is performed using an electromagnetic force by the driving section including the coil 142 and the magnet 143.

Figure 7:
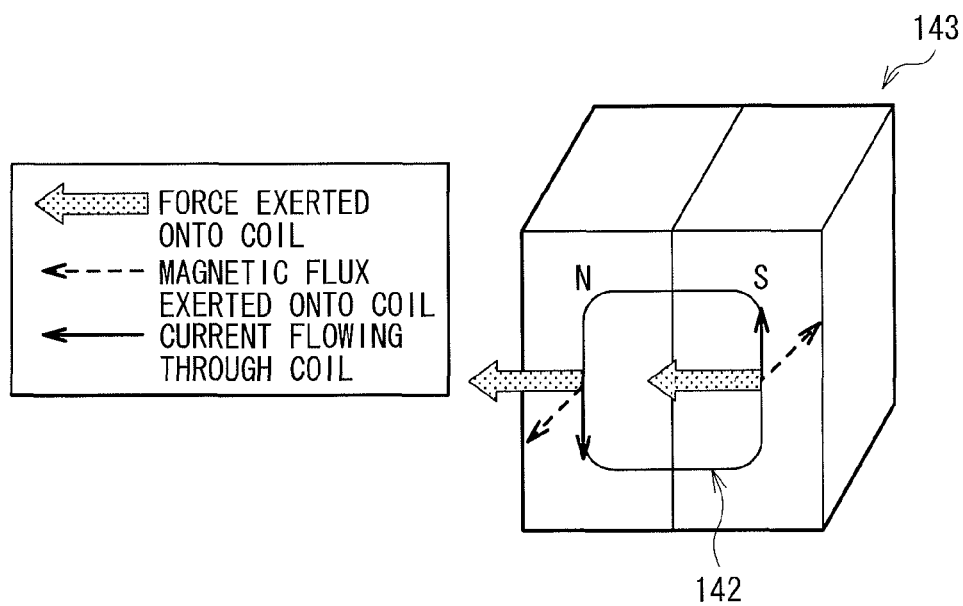
FIG. 7 is a schematic diagram for explaining an outline of the Fleming's left-hand rule.

More specifically, as shown in an example in FIG. 7, when a current (driving current Id) flows through the coil 142 and a magnetic flux is generated in a direction orthogonal to the current-flowing direction, a force is exerted onto the coil 142 along a direction orthogonal to any of these directions (Fleming's left-hand rule). By utilizing such a force exerted onto the coil 142, the optical element 140 is oscillated by the driving section.

By oscillating the optical element 140 in such a manner, the present embodiment reduces generation of a speckle noise (interference pattern) caused by a laser beam based on the above-described principle.

(3. Operation for Reducing Excessive Oscillating Amplitude Caused by Transient Response Phenomenon)

Figure 8:
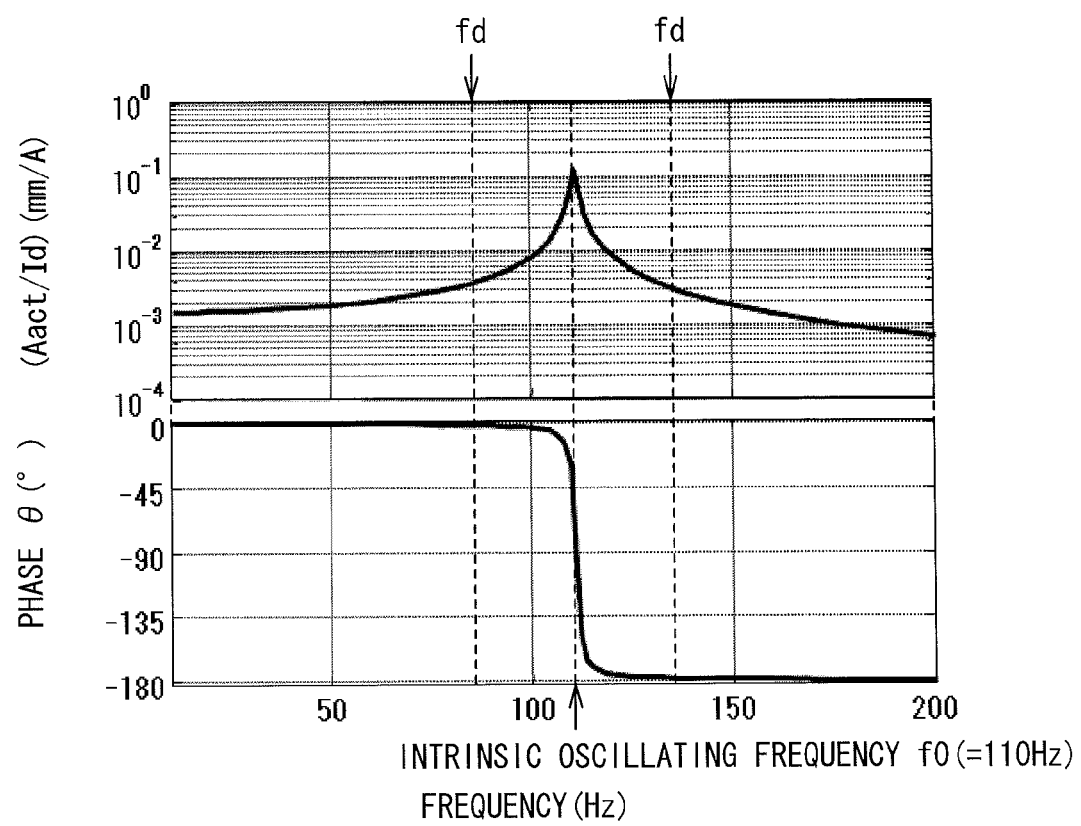
FIG. 8 is a characteristic diagram showing an example of a relationship of an intrinsic oscillation frequency with an oscillating amplitude value and a phase during oscillation of an optical element.

Meanwhile, in oscillating the optical element 140 as described above, the frequency characteristic of (oscillating amplitude value Aact/driving current Id) and phase θ during the oscillating operation of the optical element 140 is plotted respectively as represented in a Bode diagram shown in FIG. 8 for example. That is, in the oscillating operation of the optical element 140, there is an intrinsic oscillating frequency (f0=about 110 Hz in this example) that is determined depending on, for example, the above-described plate spring 146 and the spring stiffness as well as a weight of the moving part. Because a frequency region in the vicinity of this intrinsic oscillating frequency f0 exhibits a characteristic that the oscillating amplitude value Aact at the time of oscillation using a given fixed driving current Id increases rapidly, it is possible to perform the oscillating operation with less driving current Id, thereby allowing to achieve low power consumption. As shown in FIG. 8, therefore, it is preferable to set the driving frequency fd within a frequency region in the vicinity of this intrinsic oscillating frequency f0, although it is likely that the following issue may arise in this case.

(3-1. Comparative Example 2)

In other words, it is likely that the operation characteristic of an optical element 140 according to a comparative example 2 as shown in (A) and (B) of FIG. 9 (characteristic showing a relationship of the operation time "t" of the optical element 140 with the amplitude value Ad of the driving current Id and the oscillating amplitude value Aact of the optical element 140) may be found. In concrete terms, during a startup period T0 of the optical element 140, a phenomenon (overshooting phenomenon) may occur in which the oscillating amplitude value Aact becomes excessive due to a transient response phenomenon. It is to be noted that the operation characteristic shown in (B) of FIG. 9 enlarges a part of period (period of 0≤t≤about 0.1 second) in the operation characteristic shown in (A) of FIG. 9 for representation.

More specifically, in the comparative example 2, the driving frequency fd of about 90 Hz, the amplitude value Ad of the driving current Id of about +/−0.2 A, and the oscillating amplitude value Aact of about +/−0.3 mm are set up. During a steady-state operation period (stable operation period) T1 (operation period of t≥about 0.3 second in this example), the oscillating amplitude value Aact is in the order of about +/−0.3 mm that is just the same as a setting value. However, during the startup period T0 (period of 0≤t≤about 0.3 second in this example) at the oscillation start (driving start) stage, the oscillating amplitude value Aact becomes excessive (absolute value thereof is greater than about 0.3 mm) as compared with the subsequent steady-state operation period T1 due to the effect of transient response (see dotted line arrow marks in (A) of FIG. 9). In concrete terms, during each of the startup period T0 and the steady-state operation period T1, the amplitude value Ad of the driving current Id is almost fixed at about +/−0.2 A, although the oscillating amplitude value Aact during the startup period T0 is in the order of about +/−0.6 mm at a maximum (about twice as large as the oscillating amplitude value Aact during the steady-state operation period T1). One reason why the oscillating amplitude value Aact becomes excessive in such a manner is assumably that, in a transient state (during the startup period T0), a frequency component (frequency component in the vicinity of this intrinsic oscillating frequency f0) that is higher than a setting value of about 90 Hz is temporally contained in the driving frequency fd. That is, as described previously using FIG. 8, because the oscillating amplitude value Aact becomes greater rapidly at a frequency region in the vicinity of this intrinsic oscillating frequency f0, the oscillating amplitude value Aact becomes excessive during the startup period T0 that includes such a higher frequency component as the driving frequency fd.

As described above, if the oscillating amplitude value Aact of the optical element 140 becomes excessive beyond the setting value, especially in attempting the miniaturization of the illuminator 2 and the display unit 1 (high-density arrangement of members), the following issue may arise. That is, during the oscillation of the optical element 140, the optical element 140 collides with surrounding members thereof (such as, for example, the plate spring 146 that is one of holding members of the optical element 140, and a unit housing 10, see FIG. 1 to FIG. 3), which could lead to generation of an abnormal noise, or a failure of the optical element 140 itself, surrounding members thereof, and the like. This is because there is a tendency that a clearance among the optical element 140 and surrounding members thereof is set up to be small in the case where an attempt is made to achieve the miniaturization of the illuminator 2 and the display unit 1 (high-density arrangement of members). For such a reason, in the comparative example 2, it is difficult to reduce generation of the above-described interference pattern while suppressing an adverse effect caused by the excessive oscillating amplitude of the optical element 140.

(3-2. Present Embodiment)

Accordingly, in the illuminator 2 according to the present embodiment, during the driving operation for the optical element 140, the control section 19 controls the driving operation to allow the oscillating amplitude value Aact of the optical element 140 in the startup period T0 to be equal to or less than the oscillating amplitude value Aact of the subsequent steady-state operation period T1. In concrete terms, the control section 19 controls the oscillating amplitude value Aact in the startup period T0 and that in the steady-state operation period T1 by controlling the amplitude value Ad of the driving signal (driving current Id) to be used during this driving operation (by controlling the operation of the signal generator 147).

More specifically, in the present embodiment, as shown in FIG. 10A for example, the control section 19 performs a control to allow the amplitude value Ad of the driving current Id in the startup period T0 (period of 0≤t≤about 0.2 second in this example) to be smaller than the amplitude value Ad of the steady-state operation period T1 (period of t≥about 0.2 second in this example). Further, especially in this example, during the startup period T0, a control is performed to gradually increase the amplitude value Ad up to the value of the steady-state operation period T1 (see dotted line arrow marks in FIG. 10A). It is to be noted that, in the present embodiment, the driving frequency fd of the driving current Id is a fixed value (constant value) during both of the startup period T0 and the steady-state operation period T1.

Consequently, as shown in an example in FIG. 10B, the oscillating amplitude value Aact of the optical element 140 in the startup period T0 is equal to or less than (less than in this case) the oscillating amplitude value Aact in the subsequent steady-state operation period T1. As a result, this reduces the excessive oscillating amplitude caused by the above-described transient response phenomenon during the startup period T0 (see dotted line arrow marks in FIG. 10B).

At this time, it is preferable that the control section 19 also control the laser light source (red-color laser 11R, green-color laser 11G, and blue-color laser 11B) to stop emission of laser beams from the laser light source during the startup period T0 (see note in FIG. 10B). This is because it is likely that the effect of reducing generation of an interference pattern is insufficient since the oscillating amplitude value Aact of the optical element 140 has not yet reach the setting value (value during the steady-state operation period T1) as described above during the startup period T0.

As described above, in the present embodiment, the optical element 140 through which the laser beams from the laser light source (red-color laser 11R, green-color laser 11G, and blue-color laser 11B) pass is oscillated, and the oscillating amplitude value Aact of the optical element 140 in the startup period T0 is made equal to or less than the oscillating amplitude value Aact of the subsequent steady-state operation period T1 in the driving operation for the optical element 140. Thus, the excessive oscillating amplitude due to a transient response phenomenon during the startup period T0 is reduced. As a result, it is possible to reduce generation of an interference pattern (to improve the displayed image quality), while avoiding an adverse effect caused by the excessive oscillating amplitude of the optical element 140 (for example, possibility of generation of an abnormal noise, or a failure of the optical element 140 itself, surrounding members thereof, and the like).

(2. Second Embodiment)

Next, a second embodiment of the present disclosure is described. The above-described first embodiment of the present disclosure uses a method to control the oscillating amplitude value Aact of the optical element 140 by controlling a signal amplitude value (amplitude value Ad) of a driving signal (driving current Id). On the contrary, as described hereinafter, the second embodiment uses a method to control the oscillating amplitude value Aact of the optical element 140 by controlling a signal frequency (driving frequency fd) of a driving signal (driving current Id). It is to be noted that any component parts essentially same as the first embodiment of the present disclosure are denoted with the same reference numerals, and the related descriptions are omitted as appropriate.

In the second embodiment, specifically as indicated with arrow marks in (A) and (B) of FIG. 11 for example, the control section 19 controls the driving frequency fd to be changed from an initial driving frequency fd0 to a final driving frequency fd. With such a control, as with the first embodiment, the oscillating amplitude value Aact of the optical element 140 in the startup period T0 is controlled to be equal to or less than the oscillating amplitude value Aact of the subsequent steady-state operation period T1.

More specifically, the control section 19 controls the driving frequency fd to gradually come close to the aforementioned intrinsic oscillating frequency f0 during the startup period T0. However, it is preferable that the driving frequency fd during the steady-state operation period T1 (final setting frequency) be set up to be shifted by a predetermined frequency (gap frequency Δf; about +/−10 Hz for example) from the intrinsic oscillating frequency f0. The predetermined frequency is that in which the variation characteristic of the intrinsic oscillating frequency f0 is taken into account. This is because when the driving frequency fd during the steady-state operation period T1 is fully matched with the intrinsic oscillating frequency f0, the greatest oscillating amplitude value Aact is obtained, although the oscillating amplitude value Aact changes rapidly considering that a value of this intrinsic oscillating frequency f0 may vary with a change in temperature or due to individual variation. In other words, this is because the intrinsic oscillating frequency f0 also tends to decrease with increase in temperature, since the oscillating amplitude value Aact changes rapidly in the vicinity of the intrinsic oscillating frequency f0 as described above and the plate spring exhibits a property that the spring stiffness decreases with increase in temperature.

Here, in an example shown in (A) of FIG. 11, the control section 19 controls the driving frequency fd to gradually increase from a frequency at the frequency side lower than the intrinsic oscillating frequency f0 (to gradually increase from the initial driving frequency fd0 up to the final driving frequency fd). That is, in this example, because the driving frequency fd is smaller than the intrinsic oscillating frequency f0, this corresponds to a gradual increase in the oscillating amplitude value Aact within the startup period T0 (see a dotted line arrow mark in (A) of FIG. 11).

In particular, in this example, as shown in (A) of FIG. 12 for example, the control section 19 controls the driving frequency fd during the startup period T0 (period of 0≤t≤about 0.5 second in this example) to gradually increase up to the driving frequency fd of the steady-state operation period T1 (period of t≥about 0.5 second in this example). That is, in this example, a control is performed to gradually increase the driving frequency fd from 30 Hz up to 90 Hz. It is to be noted that, in the present embodiment, the amplitude value Ad of the driving current Id is a fixed value (constant value) during both of the startup period T0 and the steady-state operation period T1.

Consequently, as shown in an example in (B) of FIG. 12, the oscillating amplitude value Aact of the optical element 140 in the startup period T0 is equal to or less than (less than in this case) the oscillating amplitude value Aact of the subsequent steady-state operation period T1. As a result, as with the first embodiment in this example as well, this reduces the excessive oscillating amplitude caused by a transient response phenomenon during the startup period T0 (see dotted line arrow marks in (B) of FIG. 12). It is to be noted that, as with the first embodiment, at this time as well, it is preferable to control the laser light source to stop emission of laser beams from the laser light source during the startup period T0 (see note in (B) of FIG. 12).

On the other hand, in an example shown in (B) of FIG. 11, the control section 19 controls the driving frequency fd to gradually go down (decrease) from a frequency at the frequency side higher than the intrinsic oscillating frequency f0 (to gradually decrease from the initial driving frequency fd0 down to the final driving frequency fd). That is, in this example, because the intrinsic oscillating frequency f0 is smaller than the driving frequency fd, this corresponds to a gradual increase in the oscillating amplitude value Aact within the startup period T0 (see a dotted line arrow mark in (B) of FIG. 11).

In particular, in this example, as shown in (A) of FIG. 13 for example, the control section 19 controls the driving frequency fd during the startup period T0 (period of 0≤t≤about 0.5 second in this example) to gradually decrease down to the driving frequency fd of the steady-state operation period T1 (period of t≥about 0.5 second in this example). That is, in this example, a control is performed to gradually decrease the driving frequency fd from 200 Hz down to 130 Hz. It is to be noted that, in this example as well, the amplitude value Ad of the driving current Id is a fixed value (constant value) during both of the startup period T0 and the steady-state operation period T1.

Consequently, in this example as well, as shown in an example in (B) of FIG. 13, the oscillating amplitude value Aact of the optical element 140 in the startup period T0 is equal to or less than (less than in this case) the oscillating amplitude value Aact of the subsequent steady-state operation period T1. As a result, as with the first embodiment in this example as well, this reduces the excessive oscillating amplitude caused by a transient response phenomenon during the startup period T0 (see dotted line arrow marks in (B) of FIG. 13). It is to be noted that, as with the first embodiment, at this time as well, it is preferable to control the laser light source to stop emission of laser beams from the laser light source during the startup period T0 (see note in (B) of FIG. 13).

As described above, in the present embodiment, the oscillating amplitude value Aact of the optical element 140 in the startup period T0 is made equal to or less than the oscillating amplitude value Aact of the subsequent steady-state operation period T1 by controlling the driving frequency fd of the driving current Id, which makes it possible to obtain the similar effects through the same operation as the first embodiment. That is, it is possible to reduce generation of an interference pattern (to improve the displayed image quality), while avoiding an adverse effect caused by the excessive oscillating amplitude of the optical element 140.

Further, when the driving frequency fd is controlled to gradually increase from a frequency at the frequency side lower than the intrinsic oscillating frequency f0 (the former method), it is possible to obtain the following effects especially as well, as compared with a case where the driving frequency fd is controlled to gradually decrease from a frequency at the frequency side higher than the intrinsic oscillating frequency f0 reversely (the latter method). That is, in the first place, a signal at higher frequency is typically more susceptible to noise. Therefore, it is assumable that the latter method has a higher probability that a noise may ride on driving waveforms of the optical element 140 to lead to a disturbance as compared with the former method. However, when there is a need for setting the driving frequency fd at very high frequency, it is necessary to set the intrinsic oscillating frequency f0 at very high frequency in the former method. To that end, it is necessary to enhance the spring stiffness by increasing the thickness of a plate spring for example, which poses a disadvantage in that more driving current Id is necessary. Accordingly, when there is a need for setting the driving frequency fd at frequency above a certain level, it may be preferable to use the former method instead of the latter method to reduce the driving frequency fd as much as possible.

(Modification Examples)

Next, the description is provided on modification examples common to the first and second embodiments as described above. It is to be noted that any component parts essentially same as the first and second embodiments of the present disclosure are denoted with the same reference numerals, and the related descriptions are omitted as appropriate.

In the first and second embodiments as described above, as shown in FIG. 14A schematically for example, the oscillating amplitude value Aact is controlled to gradually increase in such a manner that the oscillating amplitude value Aact increases linearly during the driving period T0. However, a method for controlling the oscillating amplitude value Aact is not limited thereto, and the following control method is also permitted.

Figure 14A:
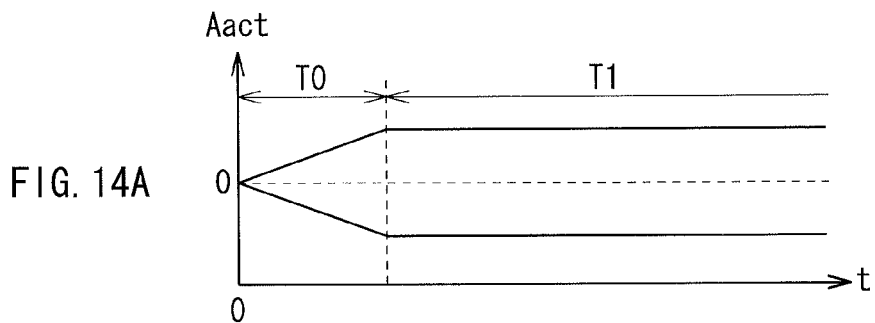
Figure 14B:
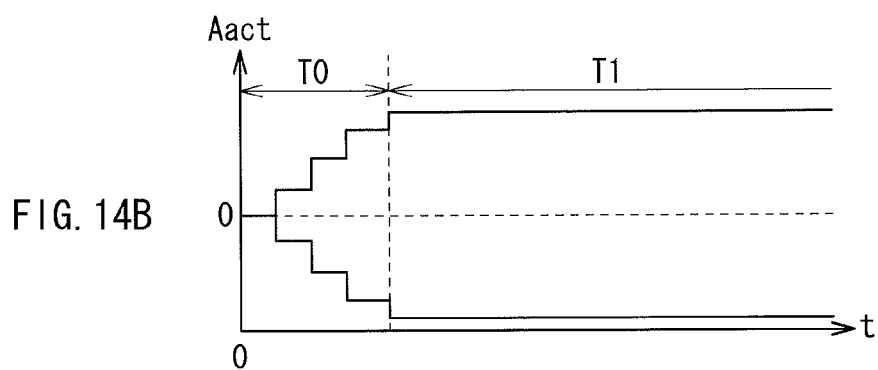

In concrete terms, as shown in an example in FIG. 14B, the control section 19 may control the oscillating amplitude value Aact to gradually increase in such a manner that the oscillating amplitude value Aact increases stepwise (in multiple steps) during the driving period T0.

Figure 14C:
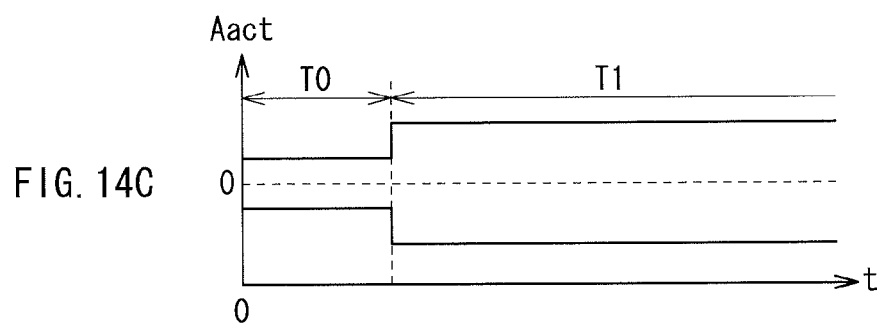

Further, as shown in an example in FIG. 14C, the control section 19 may perform a control in such a manner that the oscillating amplitude value Aact in the startup period T0 becomes a fixed value (constant value) smaller than the oscillating amplitude value Aact of the subsequent steady-state operation period T1.

Figure 14D:
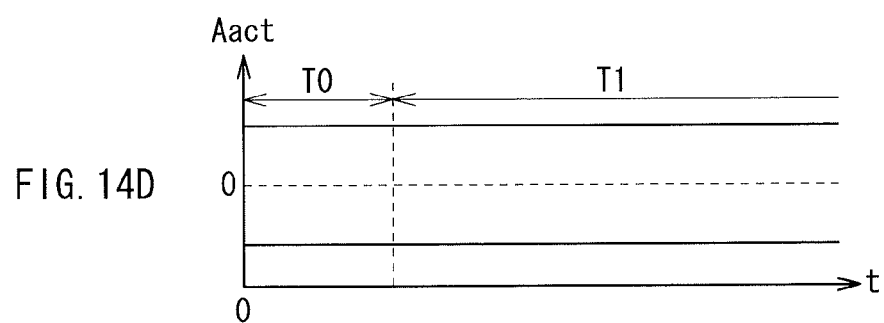

Alternatively, as shown in an example in FIG. 14D, the control section 19 may perform a control in such a manner that the oscillating amplitude value Aact in the startup period T0 becomes a fixed value (constant value) almost equivalent (preferably equivalent) to the oscillating amplitude value Aact of the steady-state operation period T1.

As described above, as long as a control is performed to allow the oscillating amplitude value Aact in the startup period T0 to be equal to or less than the oscillating amplitude value Aact of the subsequent steady-state operation period T1, it is possible to adopt various methods as a control method by the control section 19. In other words, it is good enough for the frequency component in the vicinity of the intrinsic oscillating frequency f0 that is included in a driving signal (driving current Id) to be so controlled as to be further reduced during the startup period T0, and any methods other than the techniques described above may be employed, which are considered also as preferred embodiments of the technology.

(Other Modification Examples)

The present technology is described hitherto by making reference to the embodiments and modification examples, although the present technology is not limited to these embodiments and the like, but different modifications are available.

For example, in the above-described embodiments and the like, the description is provided by making reference to the driving current Id as an example of the driving signal for the optical element 140, although it is not limited thereto. For example, a signal amplitude value of a driving voltage or a signal frequency may be controlled. Alternatively, a waveform of this driving signal is also not limited to a sinusoidal wave in the above-described embodiments and the like, but it may be any other waveform such as a rectangular wave and a triangular wave.

Further, in the above-described embodiments and the like, the description is provided on a case where the optical element is oscillated in a predetermined in-plane direction orthogonal to an optical path of a laser beam or in a direction along this optical path, although a case is not limited thereto. That is, as long as the optical element is oscillated (small oscillation), the optical element may be oscillated along any other direction.

Moreover, in the above-described embodiments and the like, the description is provided on a case where multiple types of light sources (red-color use, green-color use, and blue-color use) are all laser light sources, although a case is not limited thereto, and at least one of multiple types of light sources may be a laser light source. That is, a laser light source and other light source (such as, for example, LED) may be provided in combination within a light source section.

Additionally, in the above-described embodiments and the like, the description is provided by taking a case where the optical modulation element is a reflection mode liquid crystal element as an example, although a case is not limited thereto. The optical modulation element may be a transmission mode liquid crystal element, and further may be an optical modulation element other than the liquid crystal element.

Further, in the above-described embodiments and the like, the description is provided on a case where three types of light sources emitting light of different wavelengths are used, although, for example, one or two types, and four or more types of light sources may be used instead of three types of light sources.

Moreover, in the above-described embodiments and the like, the description is provided by taking specific examples for each component part (optical system) of the optical device, illuminator, and display unit, although all the component parts are not necessarily provided, and any other component parts may be additionally provided. In concrete terms, for example, in the above-described embodiments, the description is provided by taking a case where the control section 19 is accommodated within the housing 10 as an example, although a case is not limited thereto, but the control section 19 may be arranged at the outside of the housing 10.

Additionally, in the above-described embodiments and the like, the description is provided on a case where the projecting optical system (projection lens) that projects light modulated by the optical modulation element on a screen is provided, and the display unit is configured as a projection-type display unit, although the present technology is also applicable to any other devices such as a direct-view-type display unit.

Accordingly, it is possible to achieve at least the following configurations from the above-described example embodiments and the modifications of the disclosure.

(1) An illuminator, including:
  a light source section including a laser light source;
  an optical element through which a laser beam from the laser light source passes;
  a driving section oscillating the optical element; and
  a control section controlling, in a driving operation performed by the driving section, the driving operation to allow an oscillating amplitude value of the optical element in a startup period of the optical element to be equal to or less than the oscillating amplitude value of a steady-state operation period of the optical element that is subsequent to the startup period.

(2) The illuminator according to (1), wherein the control section controls the oscillating amplitude value in the startup period and the oscillating amplitude value in the steady-state operation period, by controlling a signal amplitude value of a driving signal used in the driving operation.

(3) The illuminator according to (2), wherein the control section controls the signal amplitude value in the startup period to be smaller than the signal amplitude value in the steady-state operation period.

(4) The illuminator according to (3), wherein the control section controls the signal amplitude value to increase gradually during the startup period.

(5) The illuminator according to (1), wherein the control section controls the oscillating amplitude value in the startup period and the oscillating amplitude value in the steady-state operation period, by controlling a signal frequency of a driving signal used in the driving operation.

(6) The illuminator according to (5), wherein the control section controls the signal frequency to gradually come close to an intrinsic oscillating frequency of the driving section during the startup period.

(7) The illuminator according to (6), wherein the control section controls the signal frequency to gradually increase from a frequency that is lower than the intrinsic oscillating frequency.

(8) The illuminator according to (6), wherein the control section controls the signal frequency to gradually decrease from a frequency that is higher than the intrinsic oscillating frequency.

(9) The illuminator according to any one of (5) to (8), wherein the signal frequency in the steady-state operation period is shifted, from an intrinsic oscillating frequency of the driving section, by a predetermined frequency in which variation characteristic of the intrinsic oscillating frequency is taken into account.

(10) The illuminator according to any one of (1) to (9), wherein the control section controls a frequency component, that is in the vicinity of an intrinsic oscillating frequency of the driving section included in a driving signal used in the driving operation, to be further reduced during the startup period.

(11) The illuminator according to any one of (1) to (10), wherein the control section stops emission of the laser beam from the laser light source during the startup period.

(12) The illuminator according to any one of (1) to (11), wherein the control section controls the oscillating amplitude value to increase gradually during the startup period.

(13) The illuminator according to (12), wherein the control section controls the oscillating amplitude value to increase linearly or stepwise during the startup period.

(14) The illuminator according to any one of (1) to (13), wherein the optical element is one of a prism array, a diffracting element, and a lens.

(15) The illuminator according to any one of (1) to (14), wherein the light source section includes three types of light sources emitting red-color light, green-color light, and blue-color light.

(16) The illuminator according to (15), wherein at least one of the three types of light sources is the laser light source.

(17) A display unit, including:
an illuminator emitting illumination light; and
an optical modulation element modulating the illumination light based on an image signal,
wherein the illuminator includes
a light source section including a laser light source,
an optical element through which a laser beam from the laser light source passes,
a driving section oscillating the optical element, and
a control section controlling, in a driving operation performed by the driving section, the driving operation to allow an oscillating amplitude value of the optical element in a startup period of the optical element to be equal to or less than the oscillating amplitude value of a steady-state operation period of the optical element that is subsequent to the startup period.

(18) The display unit according to (17), further including a projecting optical system projecting the illumination light modulated by the optical modulation element on a projection surface.

(19) The display unit according to (17) or (18), wherein the optical modulation element is a liquid crystal element.

It is to be noted that any combinations of (2) to (16) directed to the illuminator are applicable also to each of (17) and (19) directed to the display unit unless any contradictions occur. Such combinations are considered also as preferred combinations of example embodiments according to the technology.

The present disclosure contains subject matter related to that disclosed in Japanese Priority Patent Application JP 2011-209253 filed in the Japan Patent Office on Sep. 26, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An illuminator, comprising:
a light source section including a laser light source;
an optical element through which a laser beam from the laser light source passes;
a driving section oscillating the optical element; and
a control section controlling, in a driving operation performed by the driving section, the driving operation to allow an oscillating amplitude value of the optical element in a startup period of the optical element to be equal to or less than the oscillating amplitude value of a steady-state operation period of the optical element that is subsequent to the startup period,
wherein,
the control section controls the oscillating amplitude value in the startup period and the oscillating amplitude value in the steady-state operation period by controlling a signal frequency of a driving signal used in the driving operation with respect to an intrinsic oscillating frequency of the driving section.

2. The illuminator according to claim 1, wherein the control section controls the oscillating amplitude value in the startup period and the oscillating amplitude value in the steady-state operation period, by controlling a signal amplitude value of the driving signal used in the driving operation.

3. The illuminator according to claim 2, wherein the control section controls the signal amplitude value in the startup period to be smaller than the signal amplitude value in the steady-state operation period.

4. The illuminator according to claim 3, wherein the control section controls the signal amplitude value to increase gradually during the startup period.

5. The illuminator according to claim 1, wherein the control section controls the signal frequency to gradually come close to the intrinsic oscillating frequency of the driving section during the startup period.

6. The illuminator according to claim 5, wherein the control section controls the signal frequency to gradually increase from a frequency that is lower than the intrinsic oscillating frequency.

7. The illuminator according to claim 5, wherein the control section controls the signal frequency to gradually decrease from a frequency that is higher than the intrinsic oscillating frequency.

8. The illuminator according to claim 1, wherein the signal frequency in the steady-state operation period is shifted, from the intrinsic oscillating frequency of the driving section, by a predetermined frequency in which variation characteristic of the intrinsic oscillating frequency is taken into account.

9. The illuminator according to claim 1, wherein the control section controls a frequency component, that is in the vicinity of the intrinsic oscillating frequency of the driving section included in a driving signal used in the driving operation, to be further reduced during the startup period.

10. The illuminator according to claim 1, wherein the control section stops emission of the laser beam from the laser light source during the startup period.

11. The illuminator according to claim 1, wherein the control section controls the oscillating amplitude value to increase gradually during the startup period.

12. The illuminator according to claim 11, wherein the control section controls the oscillating amplitude value to increase linearly or stepwise during the startup period.

13. The illuminator according to claim 1, wherein the optical element is one of a prism array, a diffracting element, and a lens.

14. The illuminator according to claim 1, wherein the light source section includes three types of light sources emitting red-color light, green-color light, and blue-color light.

15. The illuminator according to claim 14, wherein at least one of the three types of light sources is the laser light source.

16. A display unit, comprising:
an illuminator emitting illumination light; and
an optical modulation element modulating the illumination light based on an image signal,
wherein the illuminator includes
a light source section including a laser light source, an optical element through which a laser beam from the laser light source passes, a driving section oscillating the optical element, and a control section controlling, in a driving operation performed by the driving section, the driving operation to allow an oscillating amplitude value of the optical element in a startup period of the optical element to be equal to or less than the oscillating amplitude value of a steady-state operation period of the optical element that is subsequent to the startup period, wherein, the control section controls the oscillating amplitude value in the startup period and the oscillating amplitude value in the steady-state operation period by controlling a signal frequency of a driving signal used in the driving operation with respect to an intrinsic oscillating frequency of the driving section.

17. The display unit according to claim 16, further comprising a projecting optical system projecting the illumination light modulated by the optical modulation element on a projection surface.

18. The display unit according to claim 16, wherein the optical modulation element is a liquid crystal element.

* * * * *